… (see below)

UNITED STATES PATENT OFFICE 2,181,929

MALTOSAMINE AND PROCESS FOR PREPARING IT

James H. Werntz, Wilmington, Del., assignor to E. I. du Pont de Nemours & Company, Wilmington, Del, a corporation of Delaware No Drawing. Application September 21, 1937, Serial No. 164,380

11 Claims. (Cl. 260—211)

This invention relates to the art of producing new amino-alcohols, and more particularly to the art of producing maltosamines.

The preparation of amino-alcohols by the catalytic hydrogenation of aldoses, such as glucose, in the presence of amines is shown in the U. S. Patent No. 2,016,962 to Robert B. Flint and Paul L. Salzberg. Glucamine was prepared by Ling and Nanji (J. Chem. Soc., 121, 1686 (1922)) by reducing the previously isolated aldehyde-ammonia to glucamine by catalytic hydrogenation with nickel at room temperature and atmospheric pressure. Skita and Keil, B. P. 313, 617 and Ber. 61–B, 1692 (1928) report the preparation of N-cyclohexyl arabinamine from arabinose and cyclohexylamine using a platinum catalyst at 3 atmospheres pressure and room temperature. No mention is made of a reducing polysaccharide. British Patent 297,484 and its equivalent U. S. Patent 1,845,563 discloses the reduction of sugars (none specifically mentioned) and cycloaliphatic amines as, for example, cyclohexylamine with nickel under elevated temperatures and pressures.

It has previously been reported by Bruyn and Leent, Rec. Trav. Pays-Bas. 14, 133 (1895) that maltosimine, M. P. 165° C., is obtained by the reaction of maltose with ammonia in methanol solution. I have now found that aliphatic amines also react readily with maltose in water or in alcohol solutions to form solid products. While I do not wish to commit myself as to the exact structure of these condensation products, some observations made in connection with the reaction of hexadecyl amine with maltose indicate the product to be predominantly the aldehyde ammonia rather than the imine or Schiff's base type. Thus hexadecyl amine (0.2 mol) and maltose (0.22 mol) were stirred in 500 g. of distilled methanol (which had been previously dried with sodium) at 65° C. for four hours. The solution was cooled to −7° C. and the crystals filtered off. After drying, the crystals weighed 83 g. The filtrate was distilled from a one-liter flask until the temperature reached 150° C. The solid residue weighed about 43 g. The distillate was analyzed and found to contain 0.05% water. The dry methanol was also analyzed and found to contain no water. I conclude from these results that if the Schiff's base were formed, namely, hexadecyl maltosimine, that 0.2 mol of water or 3.6 g. should have been liberated and the amount of water in the distilled filtrate should give an analytical figure of 0.72%. Therefore, the product is considered to consist of about 7% of the Schiff's base and 93% of the aldehyde-ammonia which has been designated 1-hexadecyl amino, 1-hydroxy maltose and, in accordance with the formula for maltose given by Vogel on page 42 of "Sugar and Its Derivatives," assigned the formula:

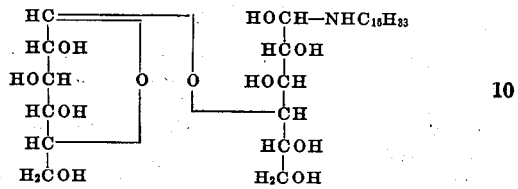

On hydrogenation hexadecyl maltosamine, $$C_{11}H_{21}O_{10}CH_2NHC_{16}H_{33}$$

is obtained which probably has the following structure:

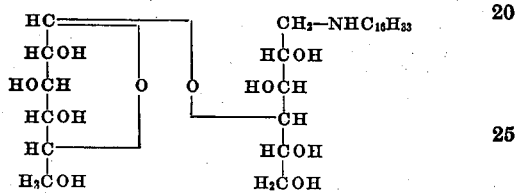

Aqueous solutions of 1-hexadecyl amino, 1-hydroxy maltose do not react with iodine whereas a Schiff's base obtained by reacting hexadecyl amine with isobutyraldehyde readily decolorizes aqueous iodine solutions.

An object of this invention is the preparation of new water-soluble amines. Another object is the preparation of new amino-alcohols. A further object of this invention is the production of new amino-nitrogen containing derivatives of maltose. Another object of this invention relates to the catalytic hydrogenation of compositions comprising maltose and ammonia or aliphatic amines having a replaceable amino hydrogen atom. A still further object is the efficient and economical preparation of cheap, water-soluble maltosamino compounds.

These objects are accomplished by the following invention. I have found that maltose reacts with ammonia and aliphatic amines to yield products which have unusual and unexpected properties, the value of which for certain purposes may be enhanced by hydrogenation. The major portion of the hydrogenation reaction may be carried out at temperatures less than 50° C. and at elevated pressures in the presence of a hydrogenation catalyst. As an example of the unusual properties exhibited by the products of this invention, dodecyl maltosamine is much more soluble in water than dodecyl glucamine and is superior as a detergent, particularly in hard water. Dodecyl glucamine does not produce a softening effect on viscose yarn whereas the reaction product of dodecyl amine with maltose produces a marked softening of viscose yarn and hexadecyl maltosamine exhibits a still higher softening efficiency. Hexadecyl amine reacts much more rapidly with maltose than with lactose. Thus by heating 3 hours at 65° C., with maltose in methanol solution, a cream-colored crystalline solid, completely soluble in water, is obtained whereas with lactose it requires heating for 15 hours at 65° C. to obtain a completely water-soluble product. The lactose derivative is colored dark brown. It is not as efficient as the corresponding maltose derivative as a softening agent for viscose rayon and its dark color makes it unsuitable for this application.

The following examples will serve to illustrate but not limit the invention. In the following examples the parts are by weight.

EXAMPLE I

Methyl maltosamine

Fifty-one and three-tenths parts of pure maltose, 6 parts of methyl amine, 10 parts of nickel catalyst prepared according to U. S. Patent 1,628,190 issued May 10, 1927, to Murray Raney, and 100 parts of water was charged into a steel shaker bomb and agitated for one hour at room temperature. Hydrogen was introduced to increase the pressure to 2,000 lbs. per sq. in. The temperature was then raised to 40° C. and the tube was shaken for four hours. The temperature was finally increased to 90° C. for 15 minutes. Hydrogen was introduced periodically to replenish that used in the reaction. The aqueous solution was filtered and concentrated at 50° C. under reduced pressure. Methyl maltosamine was obtained as a viscous syrup which was dried over phosphorus pentoxide in a vacuum desiccator. Forty-three parts of syrup were obtained which had a molecular weight of 388, as obtained by titration with dilute hydrochloric acid, as compared with a calculated value of 357.

EXAMPLE II

Octadecyl methyl maltosamine

Eighteen parts of methyl maltosamine, prepared as described in Example I, seventeen parts of octadecyl bromide, 7.5 parts of sodium carbonate monohydrate, 26.4 parts of benzene, 23.4 parts of ethyl alcohol, 23.4 parts of methyl alcohol, and 0.3 part of potassium iodide were heated five hours at 150° C., in a rotating stainless steel bomb. The resulting brown homogeneous solution was neutralized with dilute hydrochloric acid and evaporated on the steam bath until a viscous paste formed. The organic portion of the paste was removed by extraction with absolute ethyl alcohol and the alcohol solution treated with decolorizing carbon and filtered. Three and three-tenths parts of sodium carbonate monohydrate dissolved in 10 parts of water was next added to the alcoholic filtrate and the reaction mixture evaporated on the steam bath. The brown residue was dissolved in 120 parts of ethyl alcohol, chilled in an ice bath and the resulting crystalline powder filtered off. The product analyzed 1.9% nitrogen whereas the calculated value for octadecyl methyl maltosamine is 2.3% nitrogen. The octadecyl methyl maltosamine dissolved in water to give foaming solutions.

EXAMPLE III

1-dodecyl amino, 1-hydroxy maltose

Nine and two-tenths parts of dodecyl amine, 17 parts of pure maltose and 173.8 parts of water were heated on a water bath with stirring. In about 30 minutes the amine layer disappeared. The product was a viscous solution which could be diluted further with water without causing precipitation. Dilute solutions of the product foamed very much and exhibited considerable cleansing action when applied to soiled hands or soiled textiles. No separation occurred when dilute sodium hydroxide, or dilute hydrochloric acid was added to a 1% aqueous solution of this reaction product which is probably 1-dodecyl amino, 1-hydroxy maltose. No cuprous oxide precipitated when Fehling's solution was added to a 1% aqueous solution even on heating. Maltose, on the other hand, gives a precipitate of cuprous oxide very quickly when heated with Fehling's solution. 1-dodecyl amino, 1-hydroxy maltose produces a pronounced softening effect when viscose rayon yarn is treated with dilute aqueous solutions of it.

EXAMPLE IV

Dodecyl maltosamine

Seventeen and one-tenth parts of pure maltose, 25 parts of water, 12 parts of dodecyl amine, and 7 parts of 95% ethyl alcohol were warmed together on the steam bath for 15 minutes whereupon a clear viscous gel formed. The gel was diluted with 19 parts of 95% ethyl alcohol to form a mobile solution. Eight tenths part of platinum oxide catalyst was added to the reaction mixture which was next placed in a stainless steel bomb and subjected to hydrogenation under a hydrogen pressure of 1000 lbs. per sq. in. at room temperature for about 10 hours. The resulting product was filtered to remove the catalyst and then heated on the water bath under a pressure of about 30 mm. to remove the solvents. The crude product was a brown viscous syrup which was readily soluble in methyl alcohol but did not crystallize on chilling the solution. It dissolved readily in water to give foaming solutions. The crude product was purified by dissolving 5 parts in 10 parts of hot methanol and pouring into 80 parts of ice cold acetone. The precipitate which formed was separated and dried over sulfuric acid using a vacuum of about 3 mm. The resulting brown powder was very hygroscopic, softened at about 80° C., and melted with decomposition at 110° to 115° C. It analyzed 2.77% nitrogen whereas the calculated value for dodecyl maltosamine is 2.66% nitrogen. Aqueous solutions of dodecyl maltosamine do not reduce Fehling's solution in the cold but on heating give a small precipitate of cuprous oxide. Aqueous solutions of dodecyl maltosamine are good detergents in soft, alkaline, and hard water.

EXAMPLE V

1-hexadecyl amino, 1-hydroxy maltose

Twenty-four and one-tenth parts of hexadecyl amine, 34.2 parts of pure maltose and 390 parts of methyl alcohol were heated three hours at 65° C. with stirring. The crystalline product was isolated by chilling the methanol solution to 0° C. and then purified by recrystallizing from methanol solution. After drying over phosphorus pentoxide in a vacuum desiccator the crystalline product melted at 100–105° C. When viscose rayon is treated with dilute aqueous solutions of 1-hexadecylamino, 1-hydroxy maltose the fabric is softened appreciably and when the treated fabrics are pressed with a hot iron no significant odor is produced.

In place of pure hexadecyl amine I have used a mixture of hexadecyl amine with octadecyl amine with an average molecular weight of 261 for reaction with maltose. The product was isolated as a light brownish colored powder. It was an efficient softening agent for viscose yarn.

In place of pure maltose I have used a dry malt which contains 83% maltose. The product was isolated as a light brownish colored solid by filtering from the chilled methanol solution. It dissolved in water to give clear foaming solutions which produced a considerable softening effect on viscose yarn.

EXAMPLE VI

*Hexadecyl maltosamine*

Thirty parts of 1-hexadecyl amino, 1-hydroxy maltose prepared as described in Example V was dissolved in 170 parts of halogen-free dioxan. About 10 parts of nickel catalyst prepared according to U. S. Patent 1,628,190, issued May 10, 1927 to Murray Raney, was added to the reaction mixture which was then placed in a shaker bomb and subjected to 2,000 lbs. per sq. in. of hydrogen pressure at 40° C. for 6.5 hours. The product was filtered to remove the catalyst, evaporated to about one-half the original volume, chilled in an ice bath and the light brownish crystals filtered off. Twenty parts of product were obtained (after drying over sodium hydroxide in a vacuum desiccator) which softened at 115° C., and melted at 124° to 127° C. Hexadecyl maltosamine was a very efficient softening agent for viscose rayon.

A substantial hydrogen pressure is necessary for success since practically no hydrogen absorption was noted when a methyl alcohol solution of 1-hexadecyl amino, 1-hydroxy maltose prepared as described in Example V was shaken with hydrogen in a pressure bottle under a pressure of about 50 lbs. per sq. in. of hydrogen. When the reaction mixture was transferred to a steel bomb and treated with hydrogen at 2,500 lbs. per sq. in. pressure hydrogenation proceeded in normal fashion to yield hexadecyl maltosamine.

Platinum oxide prepared according to the directions described in Organic Syntheses, Collective Volume, page 452, has been used in the preparation of hexadecyl maltosamine. Thirty parts of 1-hexadecyl amino, 1-hydroxy maltose, prepared as described in Example V, 0.6 part of platinum oxide, and 156 parts of methyl alcohol were shaken with hydrogen in a shaker tube for 16 hours at 25° C., under a hydrogen pressure of 2,000 lbs. per sq. in. The solution was filtered to remove the catalyst and the filtrate evaporated to about one-half its original volume, chilled and the crystals filtered off. After drying over sodium hydroxide at about 100 mm. vacuum, 19.5 parts of light colored crystalline product was obtained which melted at about 124° to 127° C. This hexadecyl maltosamine was a good softening agent for viscose rayon.

EXAMPLE VII

*Octadecyl and octadecenyl maltosamine*

Seventeen and four-tenths parts of 9,10-octadecenyl amine, 17.1 parts of maltose and 26 parts of methanol were heated 2.5 hours at 66° C. The 1-octadecenylamino, 1-hydroxy maltose was recovered by evaporation of the methanol on a water bath under a water pump vacuum. A yellow-colored solid was thereby obtained which melted at about 125° to 130° C. It was soluble in water and gave foaming solutions which exhibited a marked cleansing action. Six-tenths part of platinum oxide was added to a methanol solution prepared as described above and subjected to hydrogenation in a steel shaker bomb operating under a hydrogen pressure of 1300 lbs. per sq. in. at room temperature for a period of 11 hours. The product was filtered to remove the catalyst and the methanol solution was chilled. Twenty parts of crystalline product was separated which did not decolorize bromine in carbon tetrachloride. This product analyzed 2.2% nitrogen, was less soluble in water than the unsaturated octadecenyl maltosamine and was considered to be octadecyl maltosamine. Octadecyl maltosamine was an efficient softener for viscose rayon. The methanol filtrate was evaporated on the steam bath and 14 parts of brown viscous product was recovered. It was purified by dissolving in warm methanol solution and precipitated by pouring into cold acetone. The light brownish colored powder dissolved in water to give clear foaming solutions. This product decolorizes aqueous iodine solutions and since it is more soluble in water than octadecyl maltosamine it is considered to be octadecenyl maltosamine. Octadecenyl maltosamine displays good detergent action when tested in the launderometer and in this property is superior to octadecyl maltosamine.

EXAMPLE VIII

*Mixture of hexadecyl and octadecyl maltosamines*

Fifty-two and two-tenths parts of a mixture of amines consisting essentially of equal parts of hexadecyl amine and octadecyl amine, 75.5 parts of pure maltose and 240 parts of methanol were stirred together at 65° C. for three hours. The solution was chilled in an ice bath and the light brownish colored crystalline powder filtered off. The product was dried over sodium hydroxide in a vacuum desiccator. Thirty parts of the dry product were dissolved in 156 parts of methyl alcohol, 5 parts of nickel catalyst prepared according to U. S. Patent 1,628,190, issued May 10, 1927, to Murray Raney, was added and the reaction mixture was agitated in a shaker tube under a hydrogen pressure of 2,400 lbs. per sq. in. for four hours at 40° C. and then for 15 minutes at 90° C. The product was filtered through kieselguhr to remove the catalyst and the filtrate chilled in an ice bath. The crystals which were filtered off were dried at about 2 mm. pressure over sodium hydroxide. The cream colored product was an excellent softening agent for viscose yarn and was as efficient as the octadecyl maltosamine described in Example VII.

EXAMPLE IX

*Maltosamine*

Six parts of ammonia, 51.3 parts of pure maltose, 94 parts of water, and 10 parts of nickel catalyst prepared according to U. S. Patent 1,628,190, issued May 10, 1927, to Murray Raney, was charged into a steel shaker bomb and agitated for one hour at room temperature. Hydrogen was then introduced to increase the pressure to 2600 lbs. per sq. in. The temperature was then raised to 40° C. and the tube shaken for four hours. The temperature was then increased to 90° C. for 15 minutes. The product was filtered to remove the catalyst and the filtrate concentrated at 50° C. under reduced pressure. Maltosamine was obtained as a viscous syrup after drying over phosphorus pentoxide in a vacuum desiccator.

EXAMPLE X

1-(N-methyl-N-heptyl) amino, 1-hydroxy maltose

Thirteen parts of methyl heptyl amine, 34 parts of pure maltose and 390 parts of methanol were heated one hour at 65° C. The product did not separate from the methanol solution when it was chilled to —50° C. so it was isolated by evaporating the methanol on the steam bath. 1-(N-methyl-N-heptyl) amino, 1-hydroxy maltose was obtained as a brownish colored syrup which was readily soluble in water. The aqueous solution foamed slightly when shaken.

During the hydrogenation there should be good contact between the reactants and the catalyst. This may be effected satisfactorily by internal stirring as in an autoclave or the entire vessel may be agitated externally. In fact, any method whereby the gas, liquid, and catalyst are brought into intimate contact will expedite the reaction.

The relatively large proportions of catalyst employed in the above examples should not be understood to be necessary for the reductions but are employed to make the reaction time as short as possible.

While hydrogenating catalysts in general, are operative in this process, I prefer to use a base metal catalyst for hydrogenation instead of the more expensive platinum catalyst. Nickel catalysts are preferred to other base metal catalysts, for example, copper, cobalt, copper chromite, etc. I may employ, for example, catalysts comprising essentially elementary nickel in a finely divided state or nickel supported on porous and inert carriers such as alumina, pumice, kieselguhr, etc.

The process is preferably carried out by preforming the condensation product of the amine and maltose prior to hydrogenation but this is not necessary. Water and alcohols are suitable solvents in which to preform the condensation products and are also satisfactory solvents for use during hydrogenation although other solvents may be used if desired.

The preformed condensation product of a primary or secondary aliphatic amine and maltose as usually prepared at temperatures lower than 100° C. are considered to be substantially of the aldehyde-ammonia type as typified by 1-hexadecyl amino, 1-hydroxy maltose. As intermediates for hydrogenation, I do not wish to restrict myself to products of this specific structure but include the dehydrated form of the aldehyde-ammonia; that is, a Schiff's base type which may be obtained with primary amines. Hexadecyl maltosimine is typical of this sort of product and is considered to have the structure:

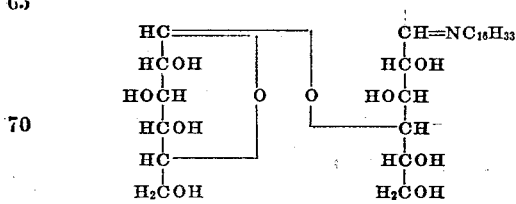

In carrying out the hydrogenation, I prefer to use temperatures between 20° C. and 90° C. Below 20° C., hydrogenation proceeds slowly and requires a long time while at temperatures above 90° C., there is evidence of degradation of the maltose. For example, in a hydrogenation carried out with nickel at 95° C., with dodecyl amine and maltose, some dodecyl glucamine was recovered from the reaction mixture. I prefer to operate at about 40° C. until the major portion of the reaction is completed and then raise the temperature to about 90° C. for a short time to insure completion of the reaction. A pressure of at least 15 atmospheres (absolute) is usually required with catalysts less active than platinum. The use of moderately high pressures is advantageous because it increases the rate of hydrogenation. It is preferred to operate between 700 and 2,500 lbs. per sq. in., but much lower pressures, for example, pressures as low as 225 lbs. per sq. in. can be successfully employed. The upper pressure is, of course, limited only by the strength of the reaction vessel. The specific pressures given herein are gauge pressures.

Other amines which may be used for condensation with maltose prior to hydrogenation to a maltosamine include diethylamine, mono-n-propylamine, di-n-propylamine, mono-isopropylamine, di-isopropylamine, di-n-butylamine, mono-isobutylamine, benzylamine, cyclohexylamine, naphthenyl amine, aniline, N-methyl N-isobutylamine, N-ethyl N-hexyl amine, n-octylamine, n-decylamine, N-isopropyl N-octylamine, N-2-ethylhexylamine, N-methyl N-2-ethylhexylamine, N-methyl N-hexadecylamine, N-ethyl N-tetradecylamine, undecenyl amine, ricinoleylamine, eleostearylamine, etc. The aliphatic radicals of the amines may be the radicals of the mixture of alcohols obtainable by the catalytic ester hydrogenation or sodium reduction of natural fats and oils, such as coconut oil, cottonseed oil, castor oil, China-wood oil, sperm oil, lard oil, beef tallow, etc. The aliphatic radicals of the amines may also be the radicals of the higher alcohols obtained in the catalytic synthesis of methanol from carbon monoxide and hydrogen. In general, I prefer to use open chain aliphatic amines; that is, amines in which the carbon attached to the amino nitrogen is an open chain or aliphatic carbon. The aliphatic radical attached to the amino nitrogen may, however, be substituted by other groups as, for example, aryl, ether, ester, hydroxy, sulfo, etc., groups as in benzylamine, ethanolamine, etc. Maltosamine may also be reacted further with maltose to form dimaltosamine, etc.

When the products are to be used as surface-active agents, I prefer to start with an amine which has an open-chain aliphatic radical of at least 6 carbon atoms. For the preparation of detergents, I prefer to start with dodecylamine or the mixture of amines obtainable by hydrogenation of the mixture of nitriles prepared from coconut oil acids or 9, 10-octadecenyl amine or the mixture of unsaturated amines obtainable by hydrogenation of the mixture of nitriles prepared from sperm oil acids. For the preparation of softening agents, I prefer to start with octadecyl amine or the mixture of amines obtainable by hydrogenation of the mixture of nitriles prepared from beef tallow acids, lard oil acids, etc.

While the reaction between maltose and the amine and hydrogen or of the preformed amino, 1-hydroxy maltose and hydrogen constitutes the preferred form of preparing the new compositions, they may also be prepared by other methods. Thus maltosamine may be reacted with an aldehyde such as formaldehyde, or acetaldehyde or lauraldehyde, etc., at room or slightly elevated temperature followed by or accompanied by reduction with hydrogen in the presence of a nickel catalyst, preferably at slightly elevated temperature and under elevated pressure. Another method which has proved to be satisfactory consists in alkylating methyl maltosamine or any other alkyl maltosamine as, for example, N-ethyl maltosamine, N-hydroxyethyl maltosamine, dodecyl maltosamine, etc. This method is described in Example II.

In place of octadecyl bromide in Example II, I may employ any other type of alkylating agent as, for example, dodecyl chloride, dimethyl sulfate, diethyl sulfate, amyl chloride, and octyl p-toluene sulphonate. In place of methyl maltosamine, as described in Example II, I may also employ maltosamine. This process is preferably carried out by reacting the primary or secondary maltosamine and the alkyl halide in the presence of an acid-binding agent as, for example, sodium carbonate, magnesium oxide, calcium carbonate, potassium carbonate, sodium acetate, potassium acetate, etc. It is preferable also to effect the reaction in a solvent such as, for example, an alcohol-benzene mixture or an aqueous alcohol solution. In general any inert solvent may be used. It is further desirable to employ a condensation catalyst such as, for example, potassium iodide or sodium iodide. The proportions of alkyl halide, primary or secondary maltosamine, acid-binding agent, solvent, and catalyst may vary within relatively wide limits depending upon the results desired. Generally speaking, it is desirable to use at least a sufficient amount of acid-binding agent to react with all of the hydrogen halide liberated by the reaction. The temperature may vary within relatively wide limits, but should preferably be sufficiently high to enable the reaction to proceed smoothly and quickly but insufficiently high to cause the formation of decomposition products. In general, temperatures within the range of about 100° C. to 200° C. give desirable results.

In the formation of the acid addition products (salts) of the new condensation products of maltose with primary or secondary aliphatic amines or of the new secondary and tertiary maltosamines any suitable acid may be used as, for example, hydrochloric, sulfuric, phosphoric, boric, acetic, formic, lauric, oleic, stearic, etc.

The new compositions covered in this case which have an aliphatic radical of six or more carbon atoms have colloidal properties and may be advantageously used in any process involving wetting, penetrating, derging, dispersing, emulsifying, frothing, foaming, and kindred phenomena. These compositions may be employed in pure or standardized form, and if desired, in conjunction with known processing or treating agents. They may be used by themselves or in combination with other surface-active agents in any relation in which surface-active agents having colloidal properties have heretofore been used. A few of the more important uses of these new products as textile assistants will be mentioned in order that the importance and widespread applicability of these new products in the textile industries may be fully appreciated. They may be used alone or in combination with suitable detergents for cleansing and scouring vegetable and animal fibers when removing fatty or oily materials or in general in place of soap for cleansing operations. They may advantageously be employed as cleansing agents in hard water. They are especially useful in imparting to synthetic silk and in particular viscose rayon a satisfactory "hand" as a result of their softening action. The new compositions covered in this case which have an aliphatic radical of less than six carbon atoms and including maltosamine itself are useful intermediates for further alkylation to obtain novel surface-active agents.

As many apparently widely different embodiments of this invention may be made without departing from the spirit and scope thereof, it is to be understood that I do not limit myself to the specific embodiments thereof except as defined in the appended patent claims.

I claim:

1. A maltosamine of the formula

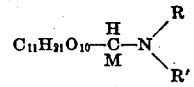

and the acid addition products thereof in which M is selected from the group consisting of hydrogen and hydroxyl, R is selected from the group consisting of hydrogen and an aliphatic radical, and R' is an aliphatic radical.

2. A maltosamine of the formula

in which R is selected from the group consisting of hydrogen and an aliphatic radical.

3. The reaction product of maltose with a member of the group consisting of aliphatic alkyl primary and alkyl secondary amines.

4. A saturated aliphatic maltosamine.

5. The process which comprises catalytically hydrogenating a mixture of maltose and a member of the class consisting of ammonia, aliphatic primary amines and aliphatic secondary amines.

6. The process which comprises catalytically hydrogenating the product obtained by reacting maltose with a member of the class consisting of ammonia, aliphatic primary amines and aliphatic secondary amines.

7. The process which comprises reacting a mixture comprising essentially hydrogen, maltose, and a member of the class consisting of ammonia and aliphatic primary and secondary amines, at a temperature between 20° C. and 50° C. and at a pressure of at least 15 atmospheres, in the presence of a base metal hydrogenation catalyst.

8. The process which comprises reacting a mixture comprising essentially hydrogen, maltose, and a member of the class consisting of ammonia and primary amine and secondary amine at a temperature between 20° C. and 90° C. and at a pressure of at least 15 atmospheres in the presence of a base metal hydrogenation catalyst.

9. Methyl maltosamine.

10. 1-hexadecylamino-1-hydroxy maltose.

11. Octadecyl maltosamine.

JAMES H. WERNTZ.